United States Patent [19]
Lyon et al.

[11] Patent Number: 5,139,093
[45] Date of Patent: Aug. 18, 1992

[54] WRAP SPRING CLUTCH FOR PERCUSSIVE APPARATUS

[75] Inventors: Leland H. Lyon, Roanoke; Robert R. Kimberlin, Troutville, both of Va.

[73] Assignee: Ingersoll-Rand Company, Woodcliff Lake, N.J.

[21] Appl. No.: 687,333

[22] Filed: Apr. 18, 1991

[51] Int. Cl.⁵ .............................................. B25D 16/00
[52] U.S. Cl. ...................................... 173/97; 173/111; 192/41 S
[58] Field of Search .................. 173/48, 110, 111, 97; 192/41 S, 75, 81 C

[56] References Cited

U.S. PATENT DOCUMENTS

| | | | |
|---|---|---|---|
| Re. 25,229 | 8/1962 | Sacchini et al. | |
| 390,029 | 9/1888 | Lombard | |
| 1,789,117 | 1/1931 | Smith | |
| 1,791,034 | 2/1931 | Lear | |
| 1,934,252 | 11/1933 | Baker | 173/110 |
| 2,566,539 | 9/1951 | Starkey | 192/41 S |
| 2,643,749 | 6/1953 | Greenlee | |
| 2,700,373 | 1/1955 | Feucht | 173/111 |
| 2,910,046 | 10/1959 | Lear | 173/111 |
| 2,979,925 | 4/1961 | Hungerford, Jr. | 192/41 S |
| 3,166,131 | 1/1965 | Worman | 173/111 |
| 3,370,680 | 2/1968 | Bangerter et al. | |
| 3,463,246 | 8/1969 | Bronnert | 173/110 |
| 4,235,133 | 11/1980 | Acevedo | |
| 4,270,637 | 6/1981 | Lowery | |
| 4,427,100 | 1/1984 | Rude et al. | |

Primary Examiner—Frank T. Yost
Assistant Examiner—Scott A. Smith
Attorney, Agent, or Firm—Glenn B. Foster; John J. Selko

[57] ABSTRACT

A clutch assembly transmits rotary motion in a percussive apparatus to a drill steel. The clutch assembly includes a first hub having a first cylindrical surface formed thereon. A second hub which is substantially rotationally coupled to the drill steel, has a second cylindrical surface formed thereon. The second cylindrical surface is coaxial with the first cylindrical surface. A wrap spring engages a portion of both the first cylindrical surface and the second cylindrical surface, wherein relative rotary motion between the first hub and the second hub is permitted in a first direction and restricted in a second direction. The wrap spring clutch transmits motion supplied from a rifle bar assembly as well as a plunger bar arrangement.

11 Claims, 4 Drawing Sheets

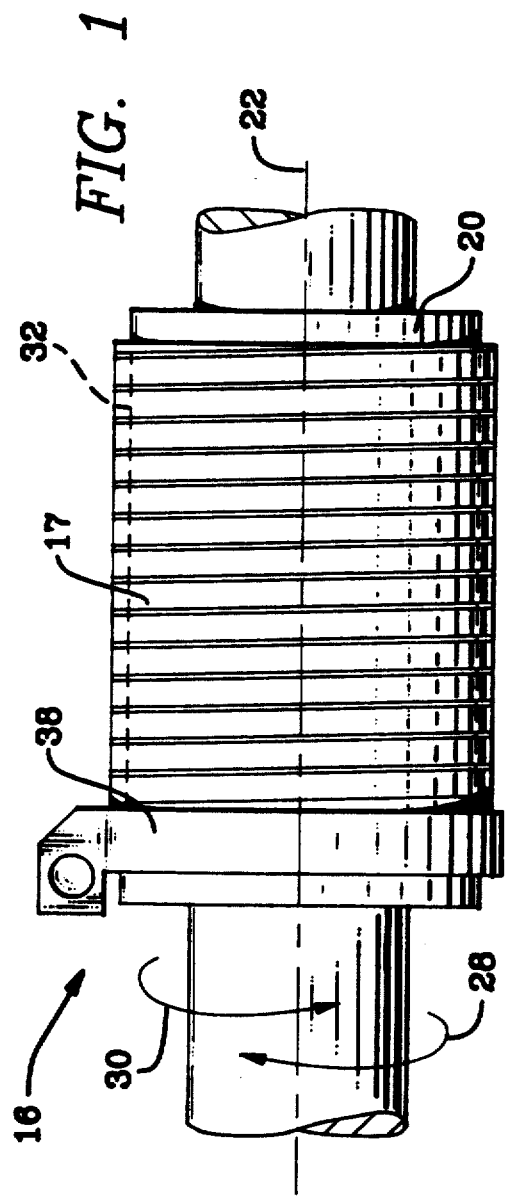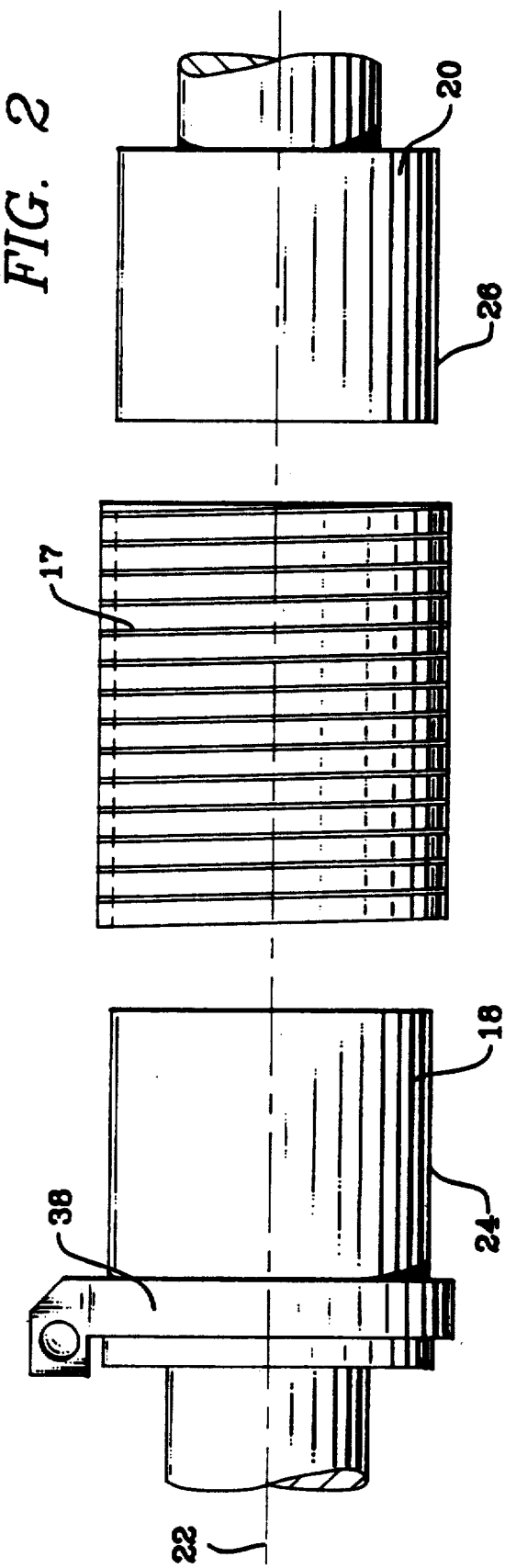

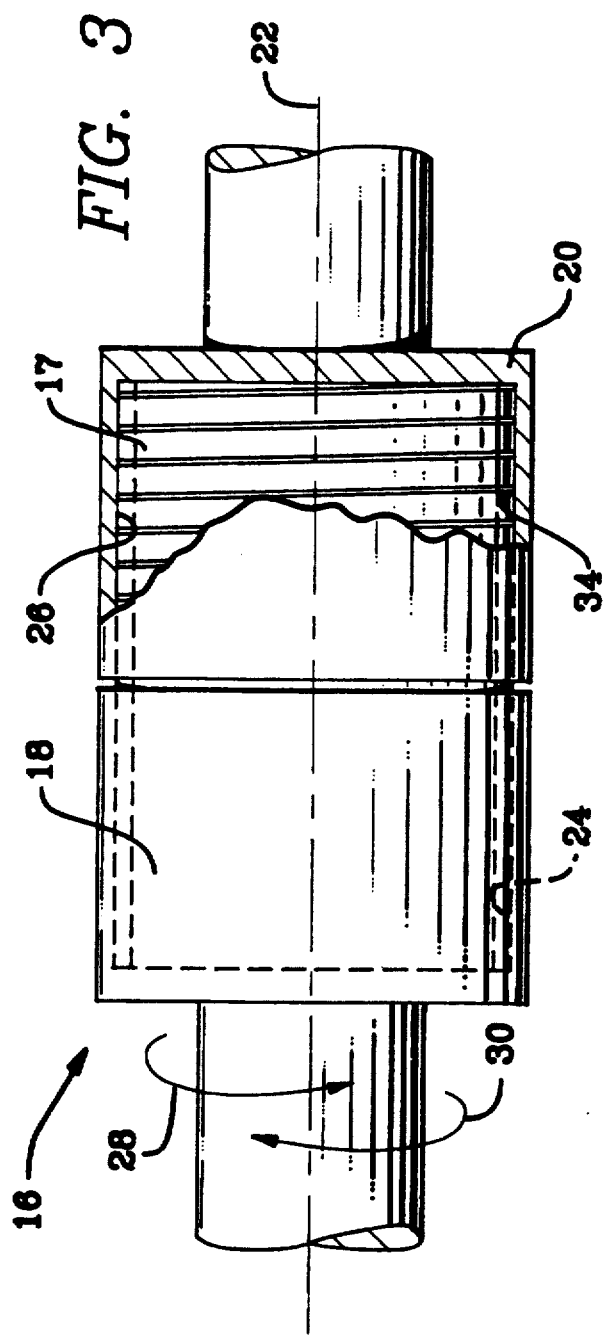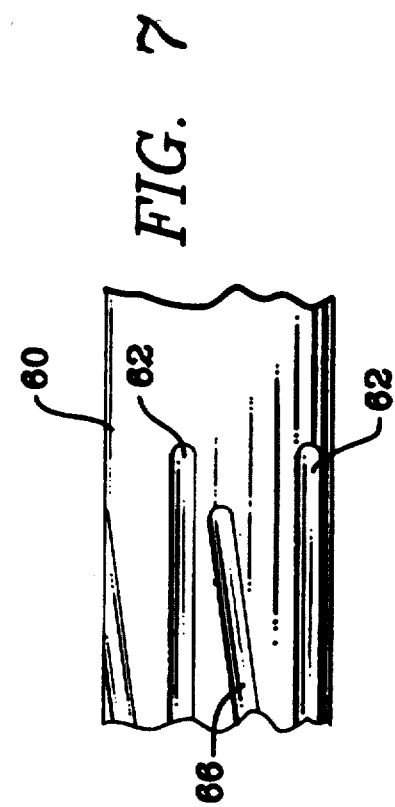

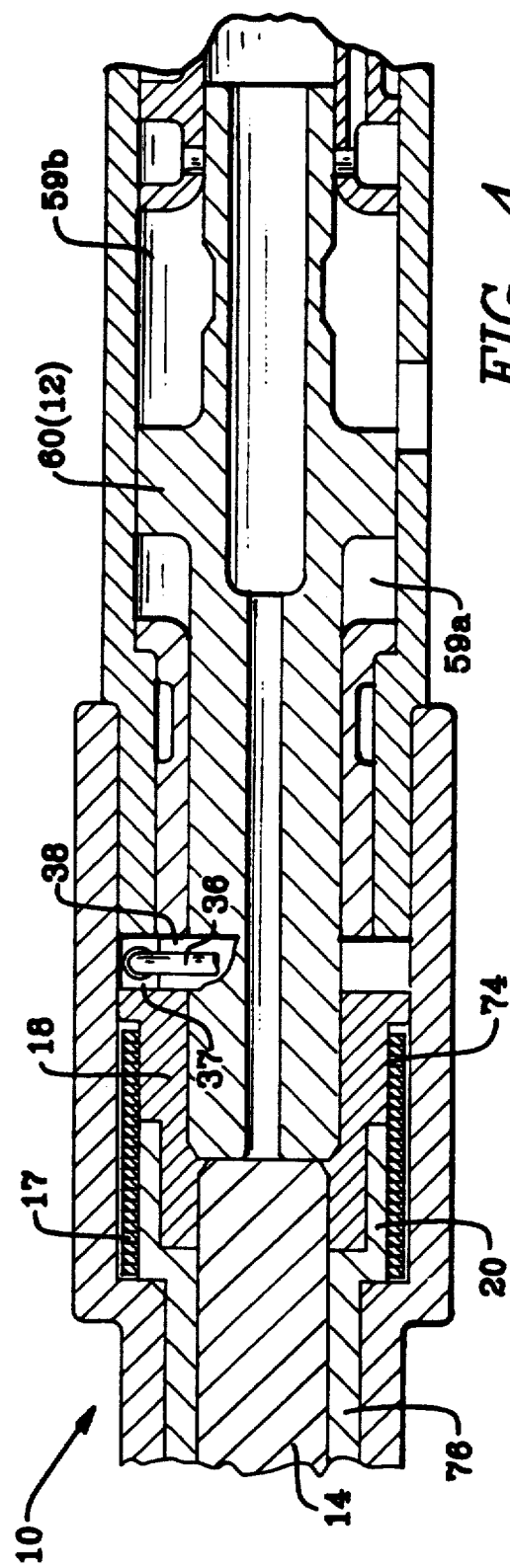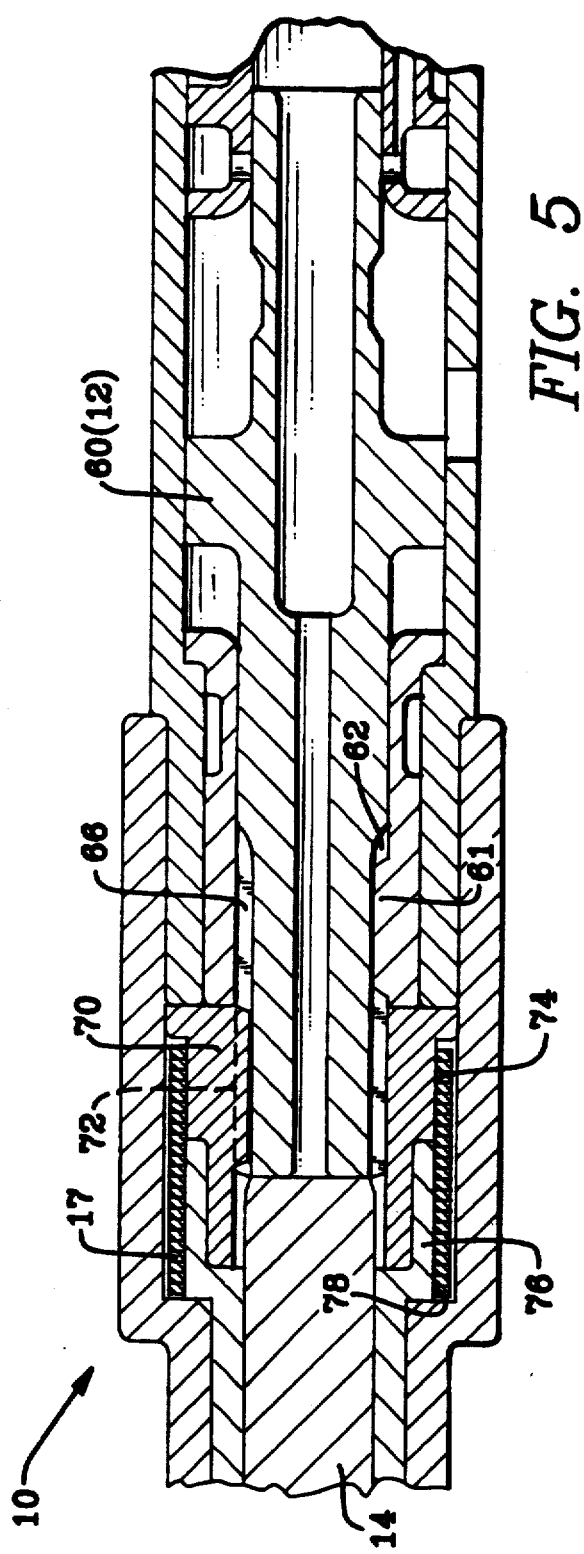

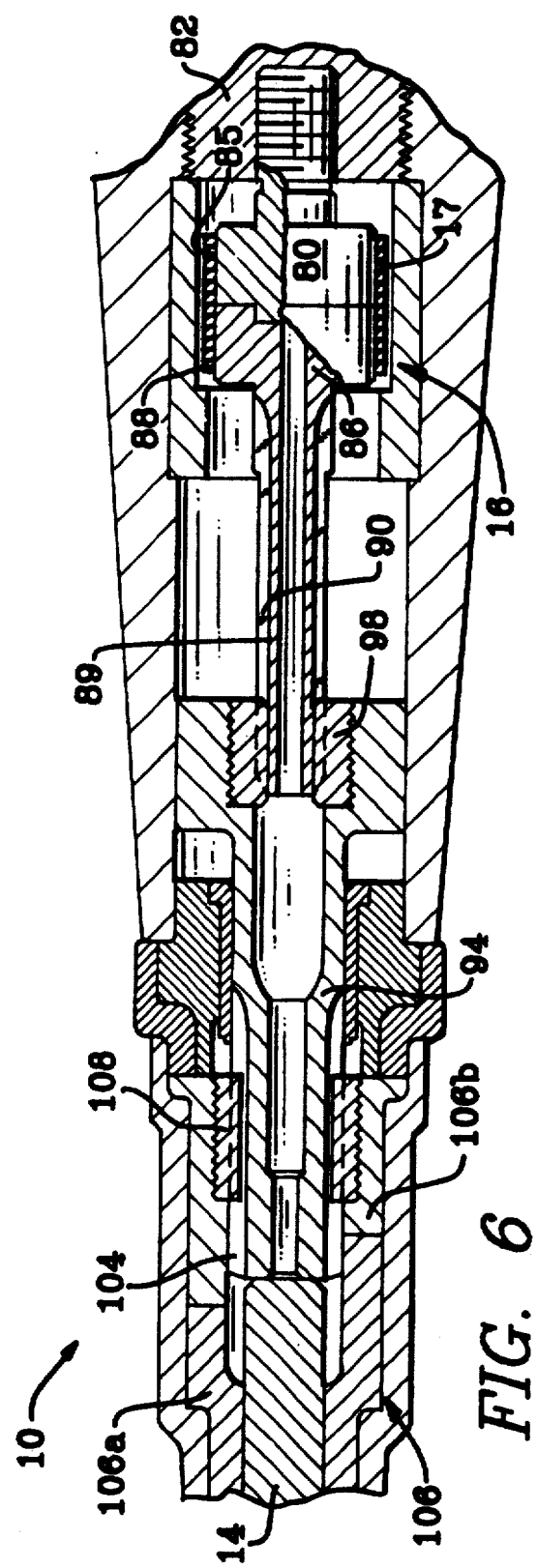

WRAP SPRING CLUTCH FOR PERCUSSIVE APPARATUS

BACKGROUND OF THE INVENTION

This invention relates generally to clutches for rock drills and the like, and more particularly to the use of wrap springs to selectively transmit rotary motion in a percussive apparatus.

Presently, ratchet pawl type clutch mechanisms are used to transmit rotational motion in percussive apparatus such as rock drills. These clutch mechanisms are difficult and expensive to machine. When a ratchet pawl clutch wears or breaks, usually the entire assembly requires repair and replacement.

Ratchet pawl clutches also add considerable complexity to the rock drill. It is preferable to simplify the rock drill structure as much as possible to enhance ease of manufacture and repair of the percussive apparatus.

The foregoing illustrates limitations known to exist in present clutches. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a clutch assembly for transmitting rotary motion in a percussive apparatus to a drill steel. The clutch assembly includes a first hub having a first cylindrical surface formed thereon. A second hub which is substantially rotationally coupled to the drill steel, has a second cylindrical surface formed thereon. The second cylindrical surface is coaxial with the first cylindrical surface. A wrap spring engages a portion of both the first cylindrical surface and the second cylindrical surface, wherein relative rotary motion between the first hub and the second hub is permitted in a first direction and restricted in a second direction.

The foregoing and other aspects will become apparent from the following detailed description of the invention when considered in conjunction with the accompanying drawing figures.

BRIEF DESCRIPTION OF THE DRAWING FIGURES

FIG. 1 is a side perspective view illustrating an embodiment of wrap spring clutch assembly;

FIG. 2 is an exploded view of the wrap spring clutch arrangement illustrated in FIG. 1;

FIG. 3 is a partially broken away view of an alternate embodiment of wrap spring clutch assembly;

FIG. 4 is a side partial-cross sectional view of a first embodiment of a percussion apparatus including a wrap spring clutch assembly of the present invention;

FIG. 5 is a side cross sectional view of an alternate embodiment of percussion apparatus including a wrap spring clutch assembly of the present invention;

FIG. 6 is a side cross sectional view of yet another alternate embodiment of percussion apparatus including a wrap spring clutch assembly of the present invention; and FIG. 7 is a partial side elevational view of a portion of the piston 60, including associated grooves, of FIG. 5.

DETAILED DESCRIPTION

In this disclosure, identical elements in different embodiments will be given identical reference characters.

In a percussive apparatus 10, generally, for example a rock drill which can be a down hole or out of the hole variety, it is desired to apply rotary motion to a drill steel 14. A wrap spring clutch assembly 16 accomplishes this transmission of rotary motion (FIGS. 1-3). The wrap spring clutch assembly 16 includes a first hub 18, a second hub 20 and a wrap spring 17.

A first hub surface 24 is formed on the first hub 18 while a second hub surface 26 is formed on the second hub 20. The first hub surface 24 and the second hub surface 26 are concentric about an imaginary axis 22.

The wrap spring 17 forms a secure engagement with both the first hub surface 24 and the second hub surface 26. No portion of the wrap spring 17 is fixedly attached to either the first hub surface 24 or the second hub surface 26.

When the first hub 18 is rotated in a first rotational direction 28 relative to the second hub 20, coils of the wrap spring 17 will become more tightly secured to both the first hub surface 24 and the second hub surface 26. Relative rotation between the first hub 18 and the second hub 20 will thereby be restricted.

Alternately, when the first hub 18 rotates in a second rotational direction 30 relative to the second hub 20, the coils of the wrap spring 17 will loosen about the first hub 18 and the second hub 20. This looseness will permit relative rotation between the first hub 18 and the second hub 20.

The first hub surface 24 and the second hub surface 26 may form either an outer circumferential surface 32 of the first hub 18 and the second hub 20 (see FIGS. 1 and 2), or an inner circumferential surface 34 thereof (as illustrate in FIG. 3). In both embodiments, relative rotation between the first hub 18 and the second hub 20 is restricted in the first rotational direction 28 while permitted in the second rotational direction 30.

There are three alternate embodiments of the present invention which transform motion of a driver 12 into indexing of the drill steel 14 in a single direction. This indexing of the drill steel is desired so that each time the drill steel contacts a working surface, it will be at a different angle and position.

In a first embodiment, illustrated in FIG. 4, a plurality of plunger rods 36 reciprocally act on opposing sides of a plunger tab 37 affixed to a plunger collar 38. Each plunger rod 36 is reversibly rotationally actuated by working fluid contained within working chambers 59a,b. Working fluid is alternately applied to the working chambers 59a,b to cause reciprocation of the piston 12, as is well known in the art. Any rotary motion of the second hub 20 is translated to the drill steel 14.

FIGS. 5 and 7 illustrates a second embodiment of the instant invention. A reciprocating piston 60 is mounted within the percussive apparatus 10. One or more axially aligned grooves 62 extend axially on the piston 60. A protuberance 61 extends from a portion of the percussive apparatus 10 into the axially aligned grooves 62. This ensures that the piston 60 will translate axially with substantially no rotation.

Also formed on the piston is one or more helical grooves 66. A piston nut or hub 70 is substantially axially fixed with respect to a portion of the percussive apparatus 10, but is rotatable within the percussive apparatus 10. A projection 72 is formed on the piston nut 70 and extends into the helical groove 66. Whenever the piston reciprocates axially within the percussion apparatus, the projection 72, which engages the helical grooves, will force the piston nut 70 to oscillate rotationally relative to the piston 60. Note that the piston 60 in the FIG. 4 embodiment does not contain grooves 62 or 66.

The piston hub or nut 70 is formed with a piston hub surface 74. A chuck 76 is disposed adjacent to the piston nut 70. A chuck hub surface 78 is formed on the chuck 76. The chuck hub surface 78 is coaxial with the piston nut hub surface 74. In this manner, the wrap spring 17 extends between, in matingly contact with, the chuck hub surface 78 and the piston hub surface 74. The wrap spring interacts with the two hub surfaces 74 and 78 as previously described.

In this manner, axial reciprocation of the piston 60 will result in rotary reciprocation of the piston nut 70, which the wrap spring assembly 16 will translate into unidirectional rotational indexing of the chuck. The drill steel 14, as described above, is substantially rotationally fixed relative to the chuck 76. However, longitudinal displacement of the drill steel within the chuck is permitted.

During the reciprocation of the piston within the percussive apparatus 10, the piston will contact the drill steel which is only permitted to be displaced a small axial distance. This contact, and the resultant displacement of the drill steel, results in the impact type motion of the drill steel.

In the two embodiments described above, a bi-directional rotational oscillation upstream of the wrap spring 17 is translated into a unidirectional indexing downstream of the wrap spring. It should be understood that the wrap spring clutch assembly 16 of the present invention may be used to translate oscillatory motion produced by any well known type device in percussive apparatus applications into uni-directional indexing motion.

In yet another embodiment of the present invention illustrated in FIG. 6, the wrap spring clutch assembly 16 includes a stationary hub 80 which is affixed to a backhead 82 of the percussion apparatus 10 and a rifle bar hub portion 86. The stationary hub 80 has a first stationary hub surface 85 formed thereon, and the rifle bar hub portion 86 has a second hub surface 88 formed thereon. The wrap spring extends between the first hub surface 85 and the second hub portion 88, and performs as previously described in this disclosure.

The rifle bar hub portion 86 includes a substantially cylindrical portion 89 with helical grooves 90 formed therein. A piston 94 is free to rotate except for any limiting contact with the rifle bar hub portion 86. One or more riders 98, which are formed on an internal surface of the piston 94, ride in the helical grooves 90 of the rifle bar hub portion 89.

The piston 94 is free to rotate about its axial length within the percussive apparatus 10. As the piston 94 travels upwardly, the wrap spring 17 will be tightened around the second hub surface 88 and relative rotation between the stationary hub 80 and the rifle bar hub portion 86 will be restricted. Therefore, each time the piston 92 travels towards the backhead 82, the piston will follow the helical grooves 90.

As the piston 94 travels away from the backhead 82, the riders 98 will exert a force against the helical grooves 92, which will act to loosen the wrap spring 17. Relative rotation will thereby be permitted between the stationary hub 80 and the rifle bar hub portion 86.

Axially aligned grooves 104 are formed on an external surface of the piston 94. A chuck 106, formed from chuck elements 106a and 106b, encases the piston 94, and one or more splines 108 are formed on an internal circumference of the chuck 106. Relative rotation is thereby restricted while longitudinal displacement is permitted, between the piston 94 and the chuck 106.

The chuck 106 is formed to encase the drill steel 14 wherein substantially any rotation applied to the piston is transmitted to the drill steel 14.

While this invention has been illustrated an described in accordance with a preferred embodiments, it is recognized that other variations and changes may be made therein without departing from the invention as set forth in the claims.

Having described the invention, what is claimed is:

1. A clutch assembly for transmitting rotary motion in a percussive apparatus to a drill steel, the clutch assembly comprising:
   a first hub having a first cylindrical surface formed thereon;
   a second hub, substantially rotationally coupled to the drill steel, having a second cylindrical surface formed thereon, the second cylindrical surface being coaxial with the first cylindrical surface;
   a wrap spring in engagement with a portion of both the first cylindrical surface and the second cylindrical surface, wherein relative rotary motion between the first hub and the second hub is permitted in a first direction and restricted in a second direction and;
   a piston reciprocally mounted in said apparatus, said piston alternately loosening and tightening said wrap spring to cause relative motion between said first and second hubs.

2. The clutch assembly as described in claim 1, wherein the first cylindrical surface and second cylindrical surface are formed on the interior of the first hub and second hub, respectively.

3. The clutch assembly as described in claim 1, wherein the first cylindrical surface and second cylindrical surface are formed on the exterior of the first hub and second hub, respectively.

4. The clutch assembly as described in claim 1, wherein the first hub is a driver hub and the second hub is a driven hub;

5. The clutch assembly as described in claim 1, wherein the first hub is rotationally fixed to a housing of the percussive apparatus and the second hub is a driven hub.

6. The clutch assembly as described in claim 1, wherein plunger rods are connected to the first hub.

7. The clutch assembly as described in claim 1, wherein a rifle bar is connected to the second hub.

8. A clutch assembly for transmitting rotary motion to a drill steel in a percussive apparatus, the clutch assembly comprising:
   a first hub having a first cylindrical surface formed thereon;
   a second hub, rotationally coupled to a chuck, having a second cylindrical surface formed thereon, the second cylindrical surface being coaxial with the first cylindrical surface;
   a wrap spring in engagement with a portion of both the first cylindrical surface and the second clindrical surface, wherein relative rotary motion between the first hub and the second hub is permitted int a first direction and restricted in a second direction;

connector means for substantially limiting relative rotation between the second hub and a drill steel, while permitting displacement therebetween and;

a piston reciprocally mounted in said apparatus, said piston alternately loosening and tightening said wrap spring to cause relative motion between said first and second hubs.

9. A percussive apparatus comprising:

a first hub having a first cylindrical surface coaxial with an axis;

a second hub having a second cylindrical surface formed thereon, the second cylindrical surface being coaxial with the axis, a radius of the first cylindrical surface being substantially equal to the radius of the second cylindrical surface;

reciprocating piston means for providing a relative rotary force between the first hub and the second hub about the axis alternately in a first an a second direction; and a wrap spring in engagement with a portion of both the first cylindrical surface and the second cylindrical surface, wherein relative motion between the first hub and the second hub will be permitted in the first direction while restricted in the second direction.

10. A percussive apparatus comprising:

a first hub having a first cylindrical surface coaxial with an axis;

a second hub having a second cylindrical surface formed thereon, the second cylindrical surface being coaxial with the axis, a radius of the fist cylindrical surface being substantially equal to the radius of the second cylindrical surface;

reciprocating piston means for providing a relative rotary force between the first hub and the second hub about the axis alternately in a first an a second direction; and a wrap spring in engagement with a portion of booth the first cylindrical surface and the second cylindrical surface, wherein relative motion between the first hub and the second hub will be permitted in the first direction while restricted in the second direction; and connector means for restricting relative rotation between the second hub and a drill steel, while permitting longitudinal displacement therebetween.

11. A percussive apparatus comprising:

a first hub having a first cylindrical surface coaxial with an axis;

a second hub having a second cylindrical surface formed thereon, the second cylindrical surface being coaxial with the axis, a radius of the first cylindrical surface being substantially equal to the radius of the second cylindrical surface;

reciprocating piston means for providing a relative rotary force between the first hub and the second hub about the axis alternately in a first an a second direction;

a wrap spring in engagement with a portion of both the first cylindrical surface and the second cylindrical surface, wherein relative motion between the first hub and the second hub will be permitted in the first direction while restricted in the second direction; and a chuck rotationally fixed to the second hub which encases the drill steel wherein relative longitudinal motion of the drill steel is permitted, while relative rotation is substantially limited.

* * * * *